April 9, 1968  J. MÜLLER  3,376,788
WORK TABLE MOUNTING FOR MACHINE TOOLS
Filed Nov. 2, 1965  3 Sheets-Sheet 1

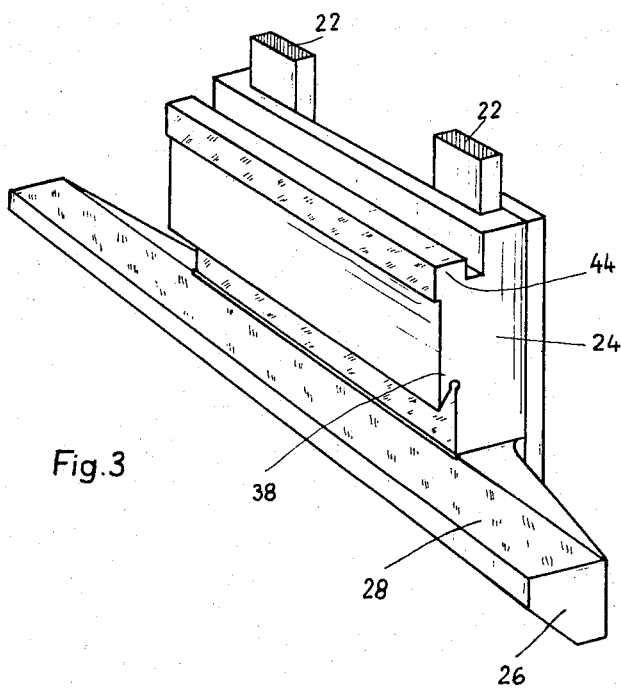

United States Patent Office  3,376,788
Patented Apr. 9, 1968

3,376,788
WORK TABLE MOUNTING FOR MACHINE TOOLS
Johann Müller, Munich, Germany, assignor to Friedrich Deckel Prazisions Mechanik und Maschinenbau, Munich, Germany, a German firm
Filed Nov. 2, 1965, Ser. No. 506,068
Claims priority, application Germany, Nov. 5, 1964, D 45,787
9 Claims. (Cl. 90—58)

ABSTRACT OF THE DISCLOSURE

There is disclosed a machine tool work table mounting comprising a bracket having near its lower edge a forwardly projecting horizontal shelf which supports the lower edge of a work table slidable along this shelf. Near its top the bracket has a rearwardly faced guide surface elongated horizontally parallel to the length of the shelf, the face of this guide surface being vertical. A vertical surface on a gib on the work table engages this guide surface on the bracket and holds a rear face on the work table snugly against a front guide surface on the bracket. A little above the horizontal shelf, an inclined guide surface on the work table cooperates with an inclined guide surface on the bracket to restrain the work table from moving upwardly relative to the bracket.

---

The present invention relates to machine tools, and more particularly to the mounting of a work table for such tools.

An object of the invention is the provision of a generally improved and more satisfactory mounting for the work table of a machine tool.

Another object is the provision of a mounting so designed that the table is held more securely against deflection or distortion from its true path of movement, under the pressures and stresses caused by the machining operation.

Still another object is the provision of a simple and economical mounting for a horizontally movable work table, so designed as to increase the range of horizontal longitudinal movement of the table without danger of deflection.

A further object is the provision of a table mounting which is especially suitable for tables having a vertical clamping surface for clamping the work, although not limited to such tables.

These and other desirable objects may be attained in the manner disclosed as an illustrative embodiment of the invention in the following description and in the accompanying drawings forming a part hereof, in which:

FIG. 3 is a perspective view of a table supporting bracket in accordance with the present invention, and associated parts.

Figure 1:
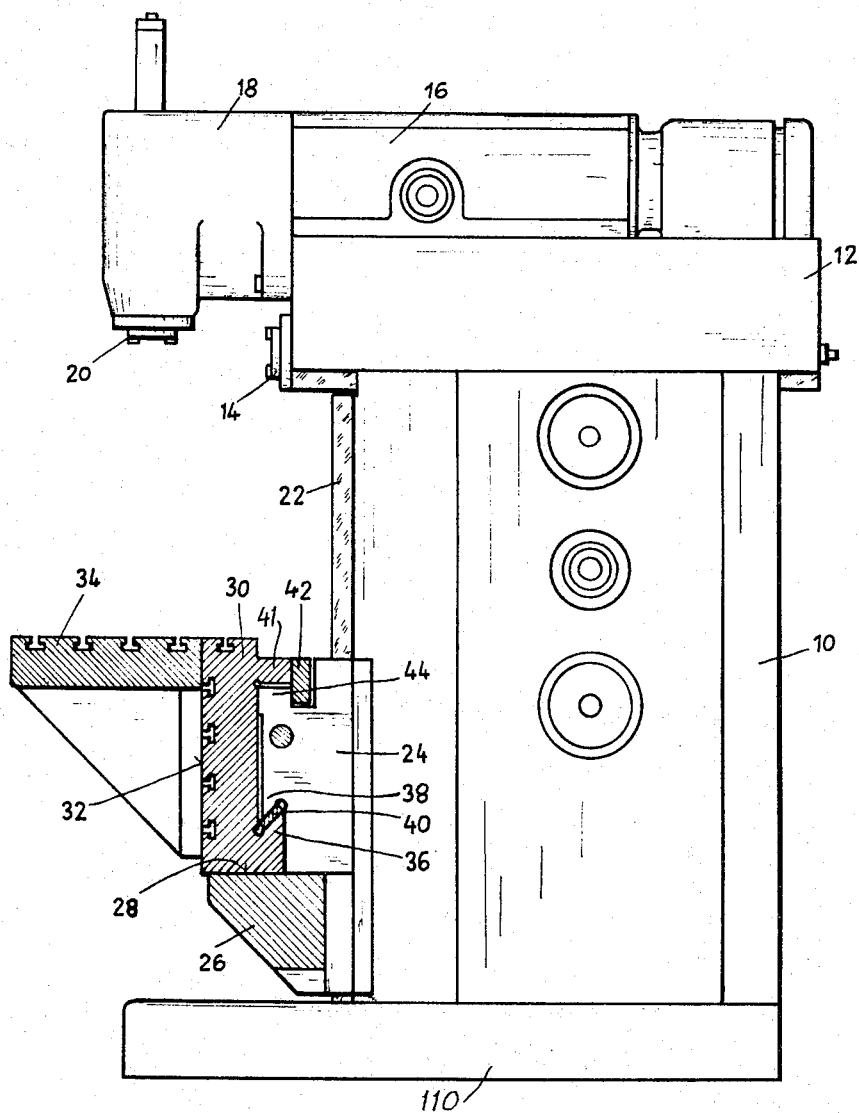
FIG. 1 is a side view of a machine tool with a work table in accordance with a preferred embodiment of the invention, the parts of the table shown in vertical section.

Except for the table mounting, the rest of the machine tool (for example, a milling machine) may be of conventional construction and need not be described in great detail. It comprises, for example, a base 110 from which rises the main machine column 10 having at or near its top a spindle stock 12 movable horizontally forwardly and rearwardly, and containing a horizontal spindle indicated in general at 14. On the spindle stock 12 there is a second spindle stock 16 carrying at its forward end a spindle head 18 with a vertical spindle 20. Milling cutters or other conventional tools can be mounted in the usual conventional way on either the horizontal spindle 14 or the vertical spindle 20.

The front of the column 10 has vertical guideways 22 which may be of conventional construction, and there is a bracket or knee 24 which moves vertically upwardly and downwardly along the guideways 22. Such vertical movement is accomplished by conventional feeding means, and the exact shape of the vertical guideways and the way in which the bracket or knee 24 engages with the guideways is also conventional, being illustrated here only in a schematic manner.

Figure 2:
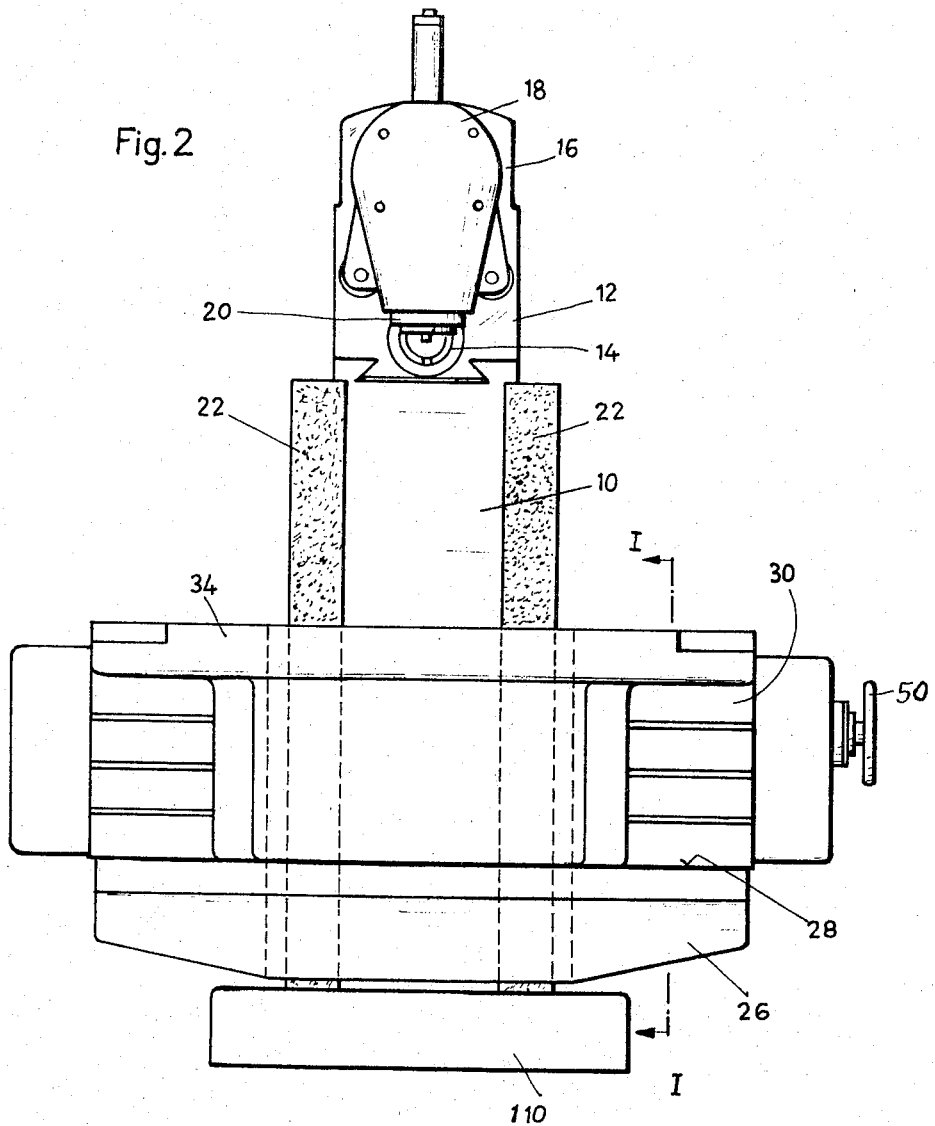
FIG. 2 is a front view of the same.

The bracket 24 has a lower part 26 forming a forwardly projecting shelf, the top surface 28 of which is finished as a smooth horizontal guideway. As best seen in FIGS. 2 and 3, this guideway 28 is extended longitudinally to project at both ends beyond the length of the main part of the bracket 24.

The work table 30 is relatively narrow or thin in a front to back direction, and has a smooth lower face which rests on and slides along the guide surface 28 of the bracket. The part 26 of the bracket extends far enough forwardly so that it is approximately flush with or stops only slightly to the rear of the vertical clamping surface 32 at the front of the work table 30. The work to be machined may be clamped directly to the vertical face 32 of the work table, or it may be clamped on the horizontal top face of an angle plate 34 which, in turn, is clamped to the face 32 of the table 30.

Closely above the guide surface 28, the rear face of the work table plate 30 is developed as an acute-angled or V-shaped guideway 36. It mates with a correspondingly shaped guideway part 38 formed on the vertical front face of the bracket 24, and an adjustable gib 40 may be interposed between the parts 36 and 38 to make a snug tight fit of these parts when the bottom face of the table 30 is resting on the guide surface 28 of the bracket 24.

At or close to the top of the work table plate 30 there is an integrally formed rearwardly extending flange 41 which carries at its rear edge a closure gib 42 projecting slightly downwardly as clearly seen in FIG. 1, to overlap with and engage snugly with the vertical rear face of the guideway portion or gib portion 44 on the bracket 24. It will be noted that the flange 41 on the table 30 is spaced slightly above the top surface of the gib 44 on the bracket, so the top surface of this gib need not be finished. However, the vertical rear surface of the gib 44 is finished, to make accurate and smooth engagement with the finished front face of the gib 42 which slides along it. Also, the front face of the gib 44 is finished as a smooth guide surface, and engages a correspondingly finished part on the rear face of the table plate 30.

This construction is particularly suitable for resisting displacing forces which arise during the milling or other machining operation. In work tables of the prior art, the top of the work table is frequently hung from an oblique or V-shaped guideway. With such a construction, if the machining forces tend to twist or rotate the work table horizontally, there is a tendency for one end of the table to ride up the oblique guideway from which it is supported, thus raising that end of the table in addition to twisting or turning it horizontally. The movement may be small, but it is nevertheless detrimental to accurate machining. With the present construction, this is impossible. The table is not hung from an oblique guide at the top, but on the contrary, the weight of the table is supported entirely from the flat horizontal guide surface 28 on the forward extension 26 of the bracket 24. It is noted here that the cooperating contact areas of the bottom surface of the table 30 and the guide surface 28 on the bracket are quite large, so that there is relatively low unit pressure between these parts, promoting easy sliding and long life without appreciable wear. The cooperating gibs 42 and 44 contact each other only on vertical surfaces, not on inclined surfaces, so that any tendency of the machining pressures to twist the table 30 in a horizontal direction is resisted by vertical engaging surfaces, with no tendency to lift the table. In any event, lifting of the table is completely prevented by the cooperating guideways 36 and 38 and the adjustable gib 40 between them, which keeps the parts tight so that the bottom surface of the table 30 is always snugly tight against the top surface 28 of the supporting bracket.

Conventional feeding mechanism serves to feed the table 30 horizontally along the longitudinal length of the bracket 24. Since the supporting surface 28 is extended longitudinally considerably beyond the ends of the rest of the bracket 24, the table 30 is well supported in all positions, and it does not matter if, at a particular point in the travel of the table, the center of gravity of the table lies outside or beyond the end of the guide portions 38 and 44, so long as the center of gravity is still above the guide surface 28.

With this construction, the parts 38 and 44 of the bracket can be made considerably shorter than the length necessary for the table guideways in the prior art, thus resulting in a saving in weight, as well as a saving in expense of machining long guideways.

As already mentioned, the bracket or knee 24 moves upwardly and downwardly on the guideway 22, by conventional feeding means, and the work table 30 moves horizontally along the bracket 24 by conventional feeding means not shown in detail. However, it may be mentioned that the handwheel 50 shown in FIG. 2 may operate a conventional screw feed for feeding the table 30 horizontally.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A mounting for a horizontally movable work table of a machine tool, comprising a support member, and a work table supported from and longitudinally movable along said support member, said table having a vertical clamping surface for clamping a workpiece and having a lower edge, characterized by the fact that said support member has a forwardly projecting guide surface and that said lower edge of said work table is developed as a guide surface which rests on and slides along said guide surface of said support member.

2. A construction as defined in claim 1, further characterized by the fact that said guide surface on said support member is substantially flat and horizontal, and that said guide surface on the lower edge of said work table is also substantially flat and horizontal.

3. A construction as defined in claim 2, further characterized by the fact that said work table has a horizontally extending undercut V-guideway on its rear surface near said lower edge and below the mid-point of the height of said work table, and said support member has a horizontally extending undercut V-guideway mating with said V-guideway of said table and so shaped and positioned as to prevent said table from moving upwardly or forwardly relative to said support member.

4. A construction as defined in claim 3, further including an adjustable gib positioned between said V-guideway of said table and said V-guideway of said support member, to tighten the pressure between the two guideways so that said lower edge of said table is held firmly down against said guide surface of said support member.

5. A construction as defined in claim 3, further characterized by the fact that said table and support member have cooperating horizontally extending guideway portions near the top of said table and above the mid-point of the height of said table.

6. A construction as defined in claim 5, in which said guideway portions have mating surfaces so placed as to hold the top of said table against forward movement away from said support member, said mating surfaces being substantially vertical so that forces tending to twist said table horizontally and increasing the horizontal pressure on said guideway portions will not tend to cause vertical movement of said table.

7. A construction as defined in claim 6, further characterized by the fact that said guideway portions near the top of said table are free of load-carrying engagement with each other in a vertical direction, the weight of said table with relation to said support member being carried entirely by said lower edge of said table resting on said projecting guide surface on said support member.

8. A construction as defined in claim 7, further characterized by the fact that said projecting guide surface on said support member is substantially longer in a longitudinal horizontal direction than the length of said V-guideways and said guideway portions.

9. A construction as defined in claim 1, further characterized by the fact that said machine tool includes an upstanding column having a vertical guideway on its front face, and that said support member is mounted on said vertical guideway for vertical movement thereon, carrying said work table bodily with it.

References Cited

UNITED STATES PATENTS 2,864,269  12/1958  Mottu _____ 90—14

GERALD A. DOST, *Primary Examiner.*